US012778842B2

(12) United States Patent
Zhou et al.

(10) Patent No.: US 12,778,842 B2
(45) Date of Patent: Nov. 3, 2026

(54) MASSAGE DEVICE

(71) Applicant: SHENZHEN YUYI ELECTRONIC TECHNOLOGY CO., LTD., Shenzhen City (CN)

(72) Inventors: Ying Zhou, Shenzhen City (CN); Bing Li, Shenzhen City (CN)

(73) Assignee: PINSHAN ELECTRONIC TECH (DONGGUAN) CO., LTD., Dongguan City (CN)

( * ) Notice: Subject to any disclaimer, the term of this patent is extended or adjusted under 35 U.S.C. 154(b) by 486 days.

(21) Appl. No.: 18/540,791

(22) Filed: Dec. 14, 2023

(65) Prior Publication Data

US 2024/0197561 A1 Jun. 20, 2024

(30) Foreign Application Priority Data

Dec. 14, 2022 (CN) ......................... 202223353889.0

(51) Int. Cl.
*A61H 23/02* (2006.01)
*A61H 23/00* (2006.01)

(52) U.S. Cl.
CPC ....... *A61H 23/0254* (2013.01); *A61H 23/006* (2013.01); *A61H 2201/0153* (2013.01); *A61H 2201/0157* (2013.01); *A61H 2201/123* (2013.01)

(58) Field of Classification Search
CPC .... A61H 2201/0153; A61H 2201/0157; A61H 2201/123; A61H 2201/1215;
(Continued)

(56) References Cited

U.S. PATENT DOCUMENTS 4,513,737 A * 4/1985 Mabuchi ............ A61H 23/0254
601/108
4,526,163 A * 7/1985 Fedders ................. A61H 7/004
601/112
(Continued)

FOREIGN PATENT DOCUMENTS

CN 111904831 A * 11/2020 ............. A61H 23/02
CN 213346740 U 6/2021
(Continued)

OTHER PUBLICATIONS

Machine translation of written description and claims for CN111904831A via google patents (Year: 2020).*
(Continued)

*Primary Examiner* — Bradley H Philips
*Assistant Examiner* — Tyler A Raubenstraw
(74) *Attorney, Agent, or Firm* — Cheng-Ju Chiang

(57) ABSTRACT

The present invention provides a massage device, comprising: a massaging head; an eccentric wheel with a shaft hole; a driver with a driving shaft that passes in the shaft hole of the eccentric wheel to drive the eccentric wheel rotating; a slider slidably installed in the eccentric wheel; a connecting rod connected to the slider and the massage head whereby the driving shaft drives the slider rotating to take the massaging head moving back and forth by the connecting rod for beating a user' muscle; and a movable seat with a shaft hole for the driving shaft passing through the shaft hole; wherein the slider is radially slidable relative the shaft hole to move close to or away from the driving shaft so as to change an eccentric radium of the eccentric wheel; and accordingly, a movement depth of the massaging head is adjustable.

19 Claims, 7 Drawing Sheets

(58) Field of Classification Search
CPC .. A61H 2201/1454; A61H 7/00; A61H 7/002; A61H 7/003; A61H 7/004; A61H 7/005; A61H 7/007; A61H 7/008; A61H 15/00; A61H 15/0078; A61H 15/0085; A61H 2201/0149; A61H 1/006; A61H 1/007; A61H 1/008
See application file for complete search history.

(56) References Cited

U.S. PATENT DOCUMENTS

| | | | | |
|---|---|---|---|---|
| 4,991,472 | A * | 2/1991 | Hollingsworth | B25B 21/02 81/464 |
| 5,839,518 | A * | 11/1998 | Setsuko | F16D 43/06 173/179 |
| 10,314,762 | B1 * | 6/2019 | Marton | A61H 1/008 |
| 10,993,874 | B1 * | 5/2021 | Marton | A61H 1/00 |
| 11,253,423 | B1 | 2/2022 | Williams et al. | |
| 11,478,400 | B1 * | 10/2022 | Marton | A61H 23/006 |
| 2015/0034353 | A1 * | 2/2015 | Huo | H02K 7/075 173/217 |
| 2017/0281457 | A1 * | 10/2017 | Witt | A61H 19/34 |
| 2018/0283508 | A1 * | 10/2018 | Aoki | B23D 51/1615 |
| 2019/0247271 | A1 * | 8/2019 | Lee | A61H 23/006 |
| 2019/0254922 | A1 * | 8/2019 | Marton | A61H 23/006 |
| 2020/0276079 | A1 * | 9/2020 | Cheng | A61H 23/0263 |
| 2020/0352821 | A1 * | 11/2020 | Wersland | A61H 23/006 |
| 2020/0405574 | A1 * | 12/2020 | Wersland | A61H 1/006 |
| 2021/0001465 | A1 * | 1/2021 | Brown | B25F 5/02 |
| 2021/0022955 | A1 * | 1/2021 | Wersland | A61B 5/0048 |
| 2021/0113421 | A1 * | 4/2021 | Chuang | A61H 39/04 |
| 2021/0113427 | A1 * | 4/2021 | Liu | A61H 23/0254 |
| 2021/0244611 | A1 * | 8/2021 | Wersland | A61H 23/006 |
| 2021/0401663 | A1 * | 12/2021 | Wersland | A61N 5/0616 |
| 2022/0168177 | A1 | 6/2022 | Vierheller et al. | |

FOREIGN PATENT DOCUMENTS

| | | | | |
|---|---|---|---|---|
| CN | 115388139 | A | 11/2022 | |
| CN | 115444733 | A | 12/2022 | |
| CN | 220070137 | U | 11/2023 | |
| JP | 2022-532147 | A | 7/2022 | |
| JP | 2023-76770 | A | 6/2023 | |
| WO | WO-2021147173 | A1 * | 7/2021 | A61H 23/02 |

OTHER PUBLICATIONS

Machine translation of written description and claims for WO2021147173A1 via google patents (Year: 2020).*

* cited by examiner

MASSAGE DEVICE

CROSS REFERENCE TO RELATED APPLICATIONS

The present invention is a 35 U.S.C. § 119 benefit of earlier filing date; right of priority of Chinese Application No. 202223353889.0, filed on Dec. 14, 2022, the disclosure of which is incorporated by reference herein.

BACKGROUND OF THE INVENTION

Field of the Invention

The present invention relates to the field of medical and healthcare device, and more particularly, to a massage device.

Description of Related Art

Massage devices are now commonly used for muscle relaxation or recovery, such as fascia massage guns, which are good tools used to recover after exercise (such as recover after stretching exercise). The fascia gun mainly massages big muscle groups of the body through vibration to relax the fascia and relief muscle pain. The fascia gun can generate vibration to relieve muscle spasms, increase blood flow, and significantly shorten muscle recovery time.

The existing fascia gun includes a motor shaft connected to an eccentric wheel, and the eccentric wheel is rotatably connected to a connecting rod. Either end of the connecting rod is connected to the motor shaft and a massage head. The rotation of the motor shaft, through the eccentric wheel and the connecting rod, causes the massage head(ball) to move forward and backward so as to percuss muscles at a high frequency and low amplitude. Due to the difference in the thickness of the fascial layer in various sections of the human body such as the head, hands, legs, buttocks, back, etc., the massage depth of the massage head(ball) also needs to be adjusted accordingly. However, for most traditional fascia guns, an amplitude or depth of movement of the massage head(ball) cannot be adjusted.

Therefore, it is necessary to provide a massage device that can adjust the depth of movement of the massage head.

BRIEF SUMMARY OF THE INVENTION

An object of the present invention aims to provide a massaging device with an adjustable massage depth.

In order to obtain the object, a massaging device provided, comprises: a massaging head; an eccentric wheel with a shaft hole; a driver with a driving shaft that passes in the shaft hole of the eccentric wheel to drive the eccentric wheel rotating; a slider slidably installed in the eccentric wheel so as to rotate together with the eccentric wheel; a connecting rod with a rotatable end connected to the slider and an opposite pulling end connected to the massage head whereby the driving shaft drives the slider rotating to take the massaging head moving back and forth by the connecting rod for beating a user' muscle; and a movable seat with a shaft hole for the driving shaft passing through the shaft hole; wherein the slider is installed at a side of the shaft hole of the eccentric wheel, and is radially slidable relative the shaft hole to move close to or away from the driving shaft so as to change an eccentric radium of the eccentric wheel; a bottom end of the slider defines an inclined groove that is inclined up and down in an direction parallel to the driving shaft; the movable seat is movable up and down along the driving shaft to move close to or away from the eccentric wheel, and the movable seat has an inclined protrusion fitted in and slidable along the inclined groove of the slider, whereby an axial movement of the movable seat will cause an radial sliding of the slider due to an engagement between the inclined protrusion and the inclined groove, which obtains a change of the eccentric radium, and accordingly, a movement depth of the massaging head is adjustable by driving the movable seat moving axially.

In some embodiments, the massaging device further comprises two thread parts either provided with external threads or internal threads and engaged with each other; due to a threaded engagement therebetween, one thread part is rotatable and the other thread part is linearly movable; the linearly movable thread part is axially movable, and is connected to the movable seat to take the movable seat axially moving; whereby the eccentric radium is adjustable by rotating the rotatable thread part to cause the linearly movable thread part and the movable seat axially moving so as to drive the slider radially sliding, and then a movement depth of the massaging head is accordingly adjusted.

In some embodiments, the rotatable thread part is an annular internal thread part; and the linearly movable thread part is an annular external thread part which is sleeved in and threadedly engaged with the annular internal thread part.

In some embodiments, the annular internal thread part is driven to rotate manually by a user or electrically by a driving motor.

In some embodiments, the annular internal thread part is provided with external gear teeth; a rotatable knob with external gear teeth is provided to mesh the annular internal thread part and drive the annular internal thread part rotating.

In some embodiments, the rotatable knob is driven to rotate manually by a user or electrically by a driving motor.

In some embodiments, the annular external thread part defines a chamber in center thereof and has an annular bottom wall; the movable seat is disposed in the chamber; the eccentric wheel is disposed above the movable seat; the driving shaft passes through the annular bottom wall and the chamber of the annular external thread part, and passes through the shaft hole of the movable seat; and then a top of the driving shaft is fitted in the shaft hole of the eccentric wheel to drive the eccentric wheel rotating; where the movable seat is rotatable together with the eccentric wheel due to a connection of the slider therebetween, and is axially movable together with the annular external thread part.

In some embodiments, the slider forms a short top shaft that is rotatably connected in a hole in the rotatable end of the connecting rod and drags the connecting rod to move back and forth when the slider rotates together with the eccentric wheel.

In some embodiments, a positioning frame is provided at one side of the shaft hole of the eccentric wheel, the slider is slidably disposed in the positioning frame and rotates together with the eccentric wheel; and the positioning frame has guide rail radially extending relative to the shaft hole, the slider is slidably supported and guided by the rail.

In some embodiments, a collar with a shaft hole is coaxially sleeved in the shaft hole of the movable seat, the draft shaft passes through shaft hole of the collar; the collar is fixed with the annular external thread part, and axially installs the movable seat and the annular external thread part together; whereby the annular external thread part takes the movable seat and the collar axially move together with the annular external thread part, while the movable seat is rotatable.

In some embodiments, a bear is coaxially sleeved between the collar and the movable seat for the movable seat rotating relative to the collar; the movable seat defines a cavity for receiving the bearing; an outer side of the bear is tightly fitted to an inner wall of the cavity, and the inner side of the bear is rotatably sleeved on the collar.

In some embodiments, an annular groove is formed along a circumference of the collar; a protruding inner flange is formed along a center hole of annular bottom wall of the annular external thread part; the inner side of the bear and the protruding inner flange are fitted in the annular groove of the collar, where the bear is rotatable, and the annular external thread part is fixed with the collar by clamping.

In some embodiments, one or more grooves are defined on an outer periphery of the shaft bushing and extend along a height thereof, one or more protrusions are provided on an inner wall of the collar along a height thereof to cooperate with the grooves respectively; thereby, the annular external thread part can take the movable seat with the collar therein to move axially along the shaft bushing by the protrusions sliding in the axial grooves

DETAILED DESCRIPTION OF THE INVENTION

Figure 1:
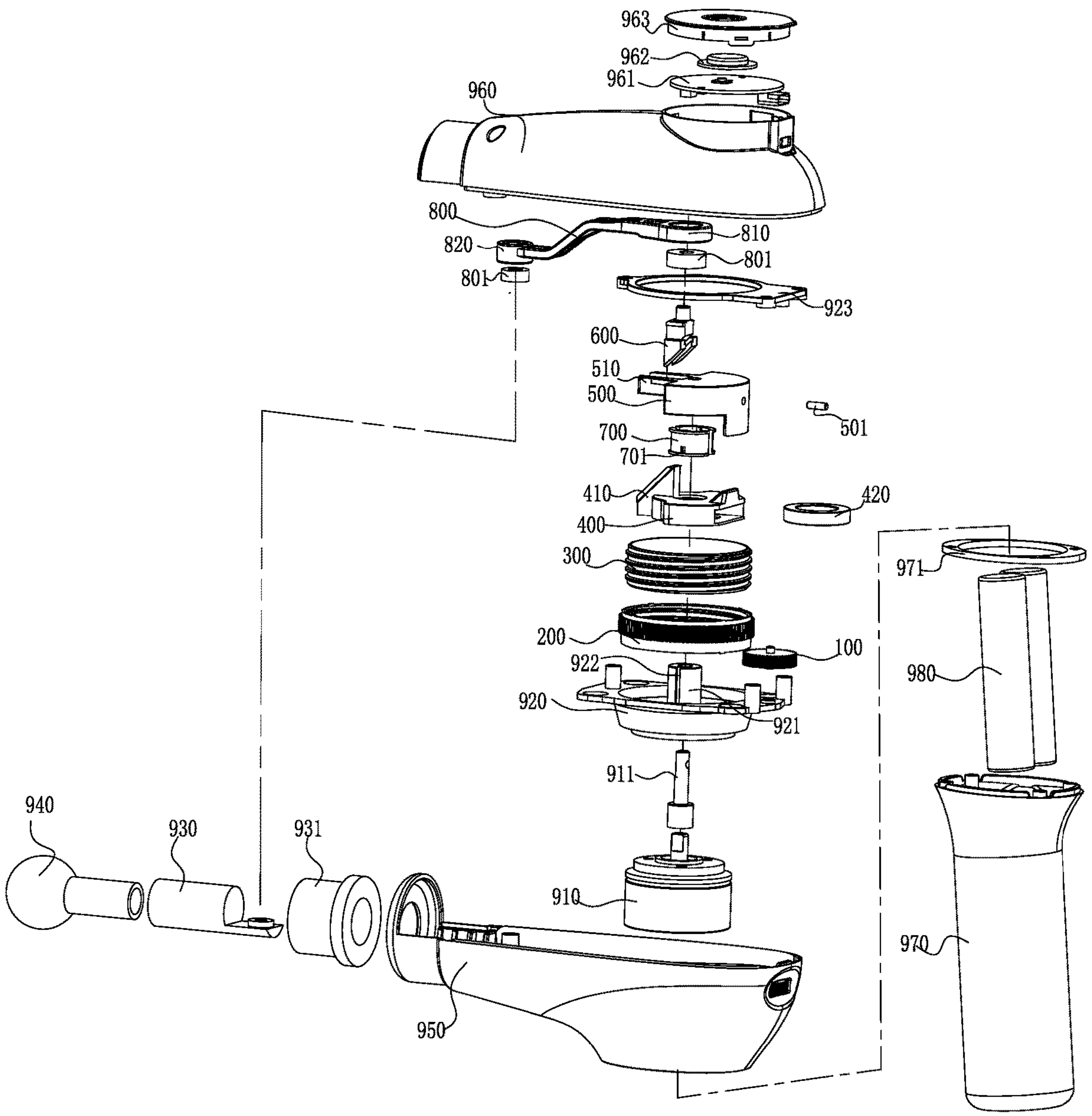
FIG. 1 is an exploded view of a massage device in accordance with an embodiment of the present invention.
Figure 2:
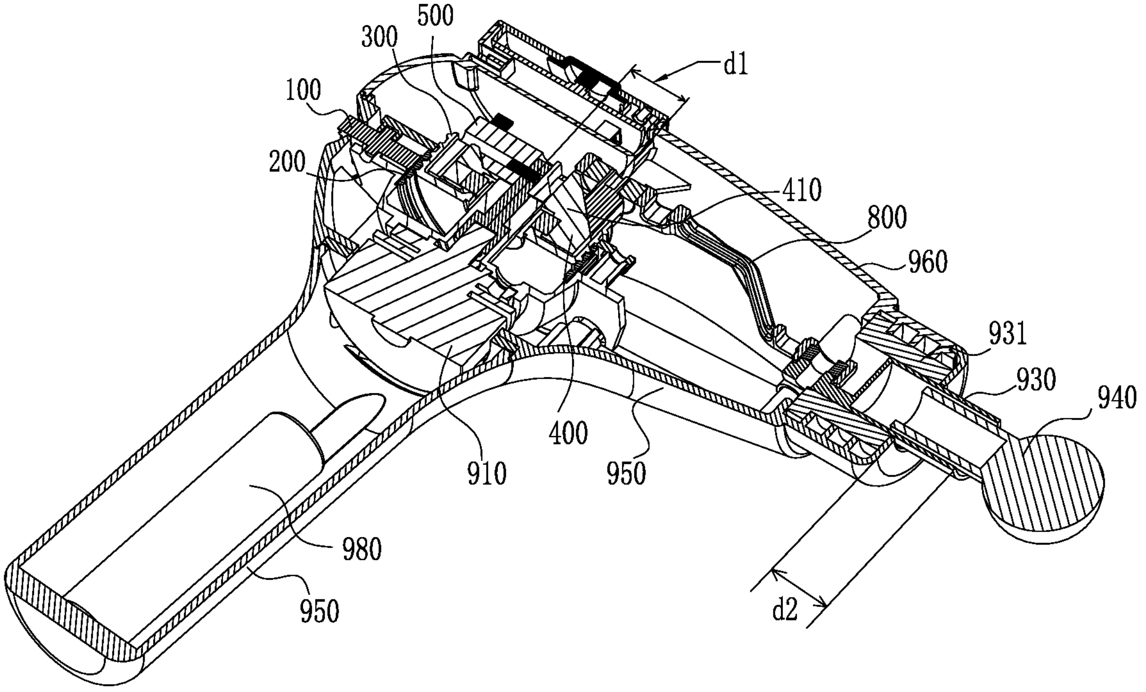
FIG. 2 is a cross-sectional view of the massage device in accordance with the embodiment of the present invention.
Figure 3:
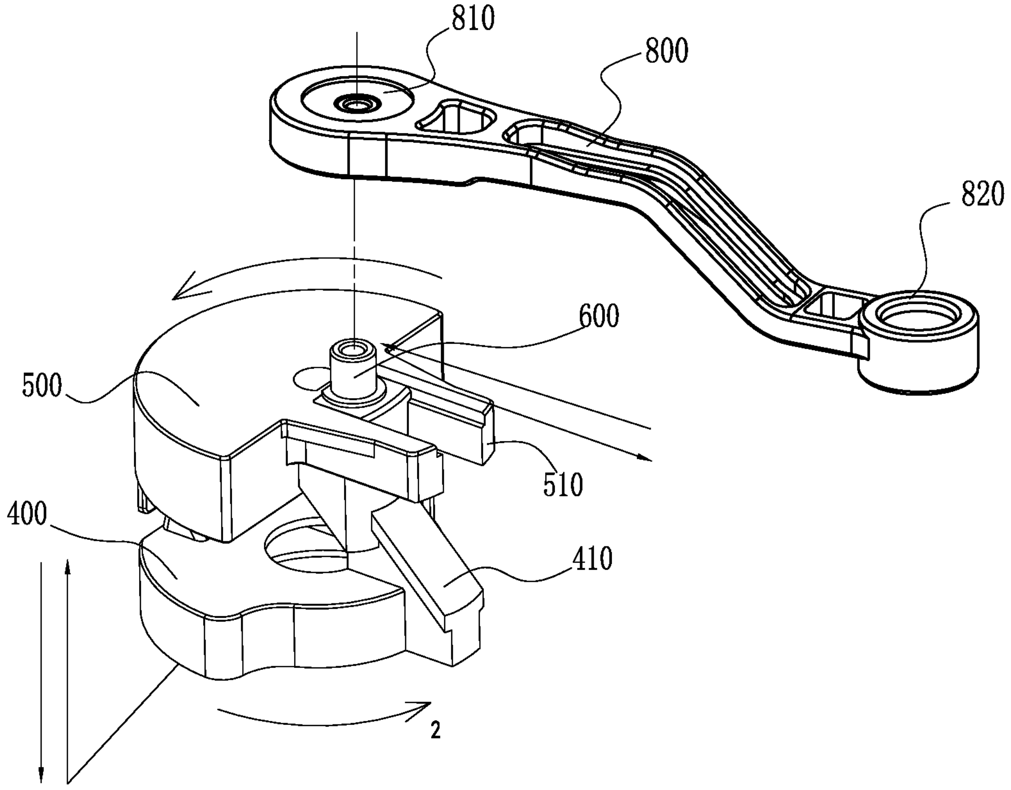
FIG. 3 illustrates some structures in the massage device in accordance with the embodiment of the present invention.
Figure 4:
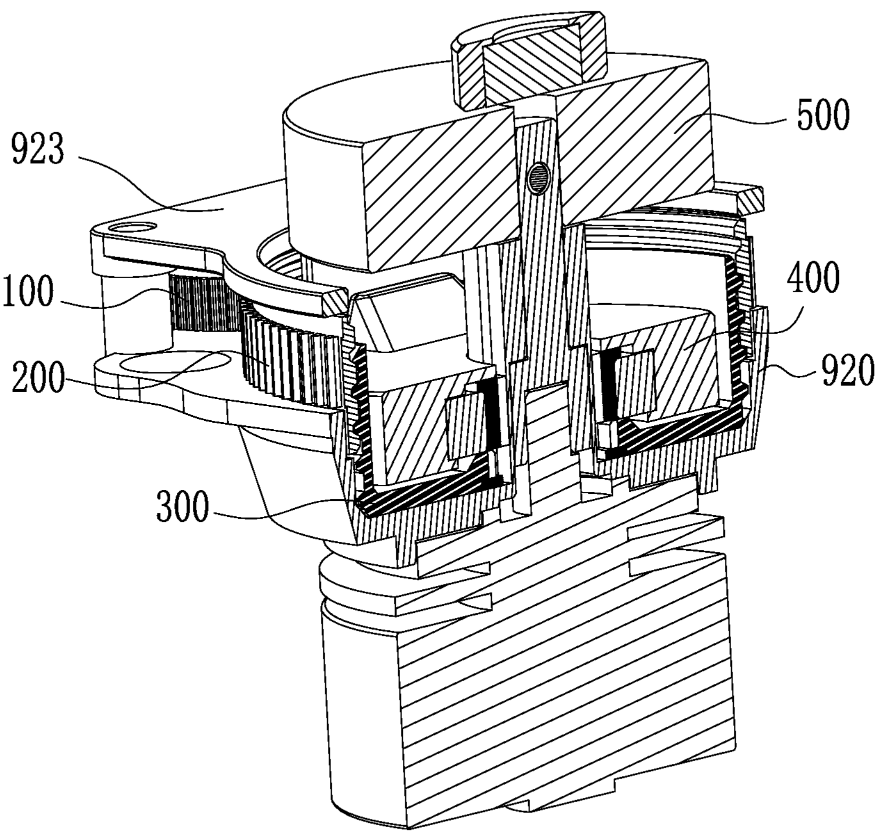
FIG. 4 is a cross-sectional view of some structures of the massage device in a first state of the present invention.
Figure 5:
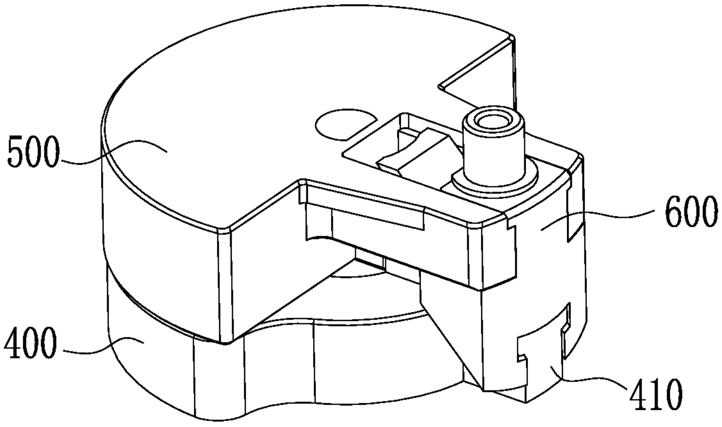
FIG. 5 illustrates an eccentric wheel assembled with a movable seat of the massage device in the first state in accordance with the embodiment of the present invention.
Figure 6:
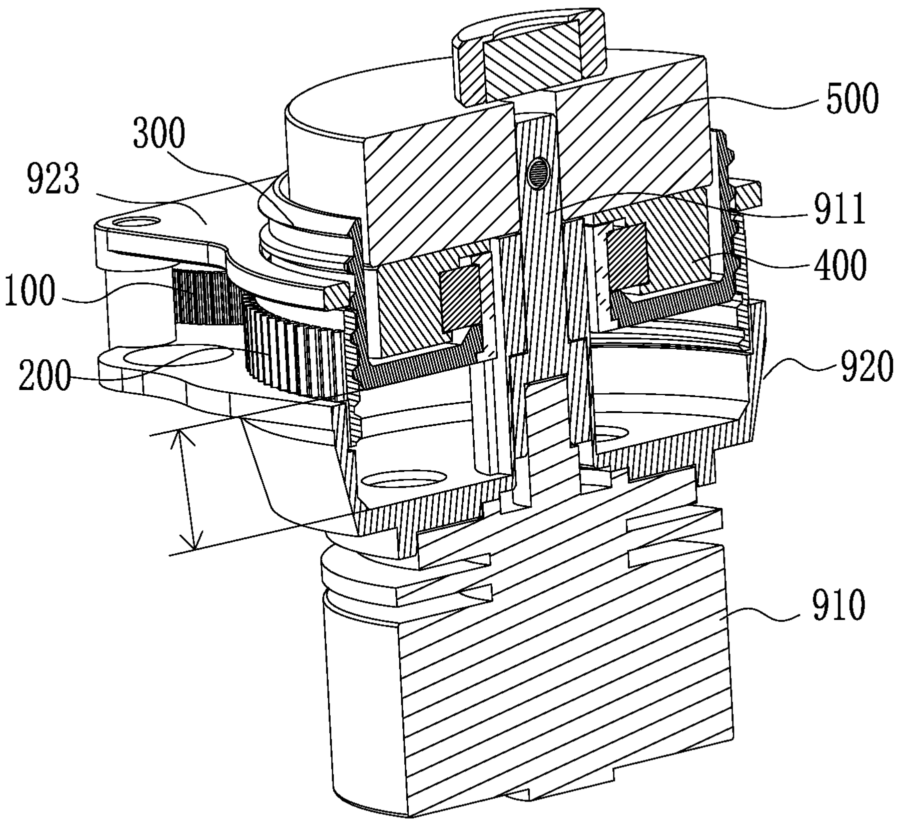
FIG. 6 is a cross-sectional view of some structures of the massage device in a second state in accordance with the embodiment of the present invention.
Figure 7:
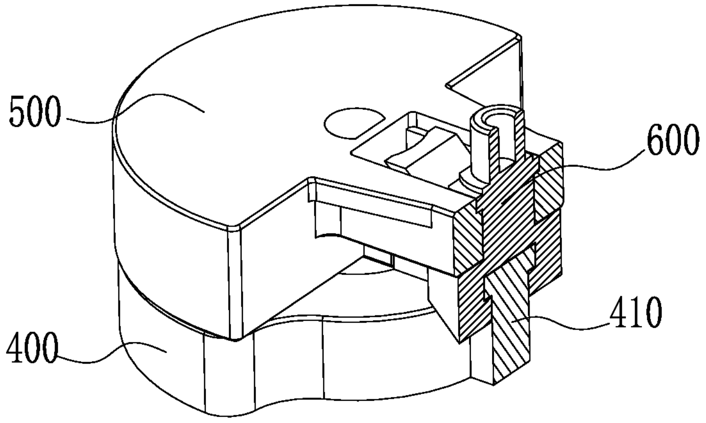
FIG. 7 illustrates the eccentric wheel assembled with the movable seat of the massage device in the second state in accordance with the embodiment of the present invention.
Figure 8:
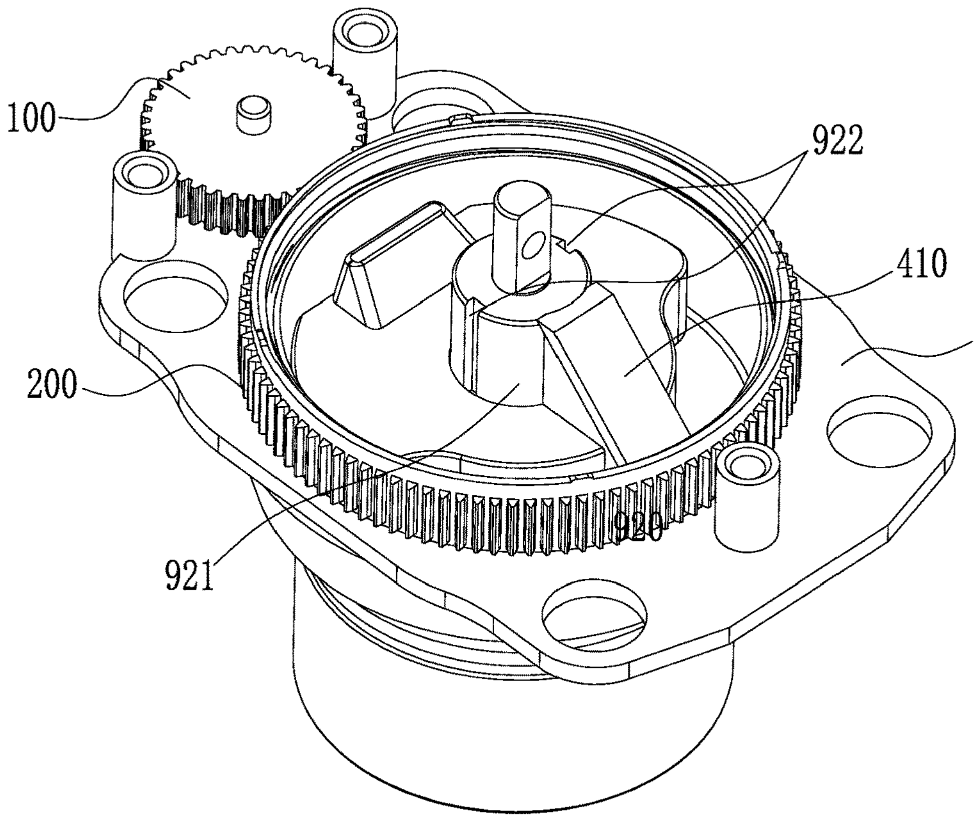
FIGS. 8-10 illustrate some structures of the massage device in accordance with the embodiment of the present invention.
Figure 9:
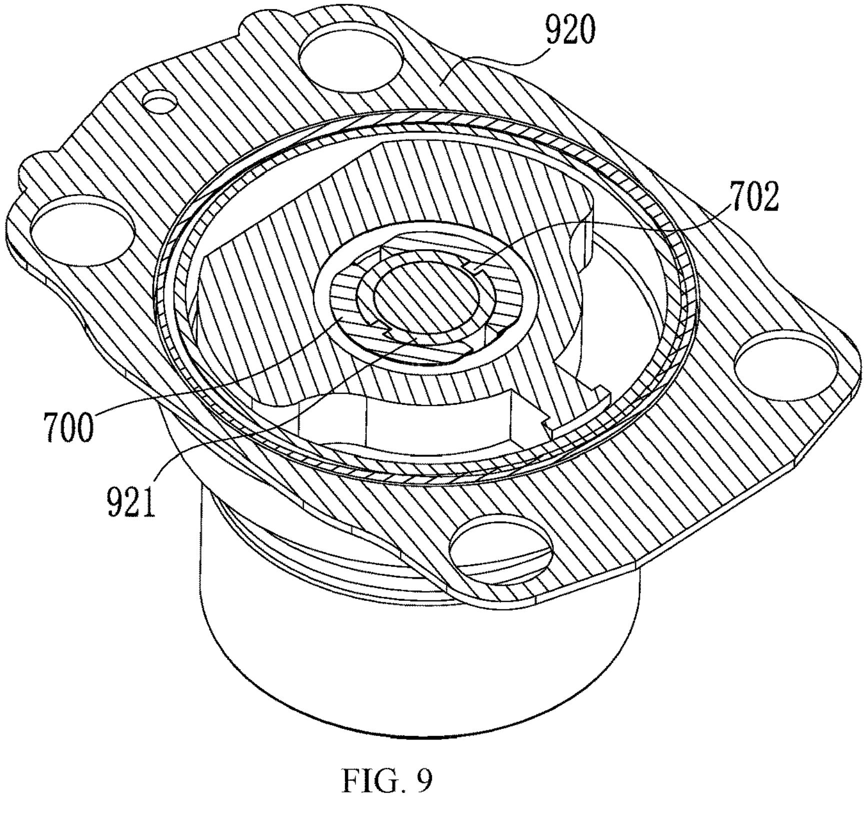

Exemplary embodiments of the present invention will be described in more detail below with reference to the accompanying drawings. Although exemplary embodiments of the present invention are shown in the drawings, it should be understood that the present invention may be implemented in various forms and should not be limited to the embodiments below. These embodiments are intended to enable those skilled in the art to understand the present invention more thoroughly.

It will be understood that the followings words used herein is for the purpose of describing particular example embodiments only and is not intended to be limiting. As used herein, the singular forms "a," "an," and "the" are intended to include the plural forms as well, unless the context clearly dictates otherwise. The terms "comprise", "include", "contain" and "have" are inclusive and thus indicate the presence of stated feature, element and/or part but do not exclude the presence or addition of one or various other features, elements, component, and/or combinations thereof.

Although the terms first, second, third, etc. may be used in the description or claims to describe various elements, components, regions, layers and/or sections, these elements, components, regions, layers and/or sections shall not be referred to as restricted by these terms. These terms are only used to distinguish one element, component, region, layer or section from another region, layer or section. Terms such as "first," "second," and other numerical terms when used in the description or claims do not imply a sequence or order unless clearly indicated by the context. Thus, a first element, component, region, layer or section discussed below could be termed a second element, component, region, layer or section without departing from the teachings of the example embodiments.

For convenience of description, spatially relative terms may be used herein to describe the relationship of one element or feature to another element or feature as shown in the figures. These relative terms, such as "inner", "outer", "inside", "outside", "below", "under", "above", "on", "top", "rear", etc. Such spatially relative terms are intended to cover different orientations of the device in use or operation in addition to the orientation depicted in the figures. For example, if the device in the figures is turned over, elements described as "below" or "under" other elements or features would then be oriented "above" or "on" the other elements or features. The device may be otherwise oriented (rotated 90 degrees or at other orientations) and the spatially relative terms used are interpreted accordingly.

Please refer to FIGS. 1 to 13, a massage device in accordance with an embodiment of the present invention includes a driver 910, a connecting rod 800, a massaging head 940, an adjustment assembly, an eccentric wheel 500, and a slider 600. The driver 910 in this embodiment adopts a driving motor. An output end of the driver 910 is set with a driving shaft 911. The driving shaft 911 is connected to the eccentric wheel 500 to drive the eccentric wheel 500 to rotate. The slider 600 is disposed at one side of a shaft hole of the eccentric wheel 500 and can move in a radial direction relative to the shaft hole of the eccentric wheel 500. The movement of the adjustment assembly drives the slider 600 to move in the radial direction relative to the shaft hole of the eccentric wheel 500. The slider 600 is connected to one end (as a rotatable end 810) of the connecting rod 800 to change a distance between the rotatable end 810 of the connecting rod 800 and a driving shaft 911 in the shaft hole of the eccentric wheel 500. The other end as a pulling end 820 of the connecting rod 800 is connected to the massaging head 940. The shaft hole and the radial direction are defined herein just for convenience of description. A driving shaft 911 of the output end of the driver 910 is fitted in the shaft hole of the eccentric wheel 500 in accordance with the embodiment of the present invention. The radial direction of the eccentric wheel 500 is perpendicular to the driving shaft 911, and usually the same as a movement direction of the massaging head 940. Specifically, the driver 910 drives the eccentric wheel 500 to rotate, and the slider 600 and the rotatable end 810 of the connecting rod 800 connected to the slider 600 rotate around the driving shaft 911 together with the eccentric wheel 500. The pulling end 820 of the connecting rod 800 is rotatably connected to the massaging head 940, thereby, when the rotatable end 810 of the connecting rod 800 rotates, the connecting rod 800 will take the massaging head 940 to move back and forth. Therefore, by changing a distance between the rotatable end 810 of the connecting rod 800 and the driving shaft 911, a movement depth of the massaging head 940 is changed, that is, the movement depth d2 of the massaging head 940 can be changed by changing a distance d1 between the slider 600 and the shaft 911 (or the shaft hole of the eccentric wheel 500).

A radial distance between the rotatable end 810 of the connecting rod 800 and the shaft 911 of the driver 910 can be changed through the cooperation of the adjustment assembly and the slider 600, where the radial distance is an eccentric radius of the eccentric wheel 500; the rotatable end 810 of the connecting rod 800 is close to or away from the driving shaft 911; that is, an eccentric radius of the eccentric wheel 500 can be changed, which will cause a movement depth of the massaging head 940 changed accordingly. Therefore, the user can adjust the movement depth of the massage device according to his desire. The distance between the shaft 911 of the driver 910 and the rotatable end 810 of the connecting rod 800 determines the rotation diameter and circumference of the rotatable end 810 of the connecting rod 800; thereby determines an amplitude or depth of reciprocating motion of the massaging head 940. The amplitude or depth of a linear reciprocating motion of the massaging head 940, is determined by the radial distance between the rotational end 810 of the connecting rod 800 and the driving shaft 911 of the driver 910.

In this embodiment, the massage device comprises an adjustment assembly and a movable seat 400. The adjustment assembly is used to take the movable seat 400 to move axially to change an axial distance between the movable seat 400 and the eccentric wheel 500. The eccentric wheel 500 takes the movable seat 400 rotating together in a working state of the massage device, that is the massage device percusses muscles. The movable seat 400 defines a shaft hole therethrough for the driving shaft 911 passing through. The movable seat 400 is provided with an inclined protrusion 410 at one side of the shaft hole thereof. Specifically, the inclined protrusion 410 has an inclined top end. The slider 600 has an inclined bottom end, specifically an inclined groove. The inclined top end of the protrusion 410 is slidable fitted in the inclined bottom groove of the slider 600 and drives the slider 600 moving radially due to the engagement between the inclined protrusion 410 and the inclined groove in the slider 600. An upper end of the slider 600 is connected to a hole in the rotatable end 810 of the connecting rod 800, the slider 600 moves radially to take the connecting rod 800 (or the rotatable end 810) moving linearly accordingly; thereby, a radial distance between the rotatable end 810 of the connecting rod 800 and the diving shaft, namely an eccentric radius of the eccentric wheel 500, is changed, and a depth (amplitude) of the linear motion of the massaging head 940 is changed accordingly.

In accordance with one embodiment of the present invention, the adjustment assembly includes an external thread part 300 and an internal thread part 200; by rotating one of the two thread parts, the other can be moved linearly according to the meshing engagement between the internal and external threads. In accordance with an embodiment of the present invention, the external thread part 300 is used to take the movable seat 400 moving linearly together by rotating the internal thread part 200. In a specific embodiment, the external thread part 300 and internal thread part 200 are annular, and the external thread part 300 is sleeved in the internal thread part 200, and threadedly engaged with each other. The annular external thread part 300 has an annular bottom wall and defines a chamber in center thereof. The movable seat 400 is disposed in the chamber, and the eccentric wheel 500 is disposed above the movable seat 400 by the slider 600.

In some embodiments, the internal thread part 200 can be rotated manually by the user or electrically such by a driving motor. For example, the annular internal thread part 200 is partially exposed outside of the massage device for the user to turn. Or, a gear or gear set can be provided to drive the annular internal thread part 200 rotating, and the gear or gear set can be manually turned by the user or electrically driven such by a driving motor.

In accordance with an embodiment of the present invention, the adjustment assembly further includes a rotatable knob 100. The annular external thread part 300 is sleeved in the annular internal thread part 200. Further, the annular internal thread part 200 is a gear disc ("gear disc" also labeled as 200 below) with external gear teeth. The rotatable knob 100 is provided with external gear teeth that mesh with external gear teeth of the gear disc 200. The rotation of the rotatable knob 100 can drive the gear disc 200 to rotate. The annular external thread part 300 is sleeved in the gear disc 200, and are meshed with each other through spiral threads, so that the gear disc 200 and the annular external thread part 300 can rotate relative to each other circumferentially and move axially relative to each other. The movable seat 400 is provided in the annular external thread part 300 and can move along the axial direction together with the annular external thread part 300. Specifically, in accordance with an embodiment, the rotatable knob 100 is partially exposed outside the massage device, which is convenient for the user to push and rotate it. In other embodiments, the rotatable knob 100 may not be provided, but the gear disc 200 is partially exposed outside the massage device and may be directly pushed to rotate.

A positioning frame 510 is provided at one side of the shaft hole of the eccentric wheel 500, and the slider 600 is slidably disposed in the positioning frame 510 and rotates together with the eccentric wheel 500. Specifically, the positioning frame 510 has guide rail radially extending, the slider 600 is slidably supported and guided by the rail. There are two guiding rails either defining a guiding groove extending along the rail. The slider 600 has two protruding flanges either slidably received in the rail (guiding groove). The slider 600 can slide radially along guiding groove of the positioning frame 510, which can obtain a change of the radial distance between the slider 600 and the driving shaft. The slider 600 forms an inclined bottom end adapted for and connected to the inclined protrusion 410 of the movable seat 400, has a middle body with two opposite protruding flanges for sliding along the rail (or the guiding groove) of the eccentric wheel 500, and forms a short top shaft connected in the hole in the rotatable end 810 of the connecting rod 800.

The output end of the driver 910 is coupled to a driving shaft 911; the eccentric wheel 500 and the movable seat 400 each define a shaft hole are all sleeved on the driving shaft

911 through the shaft holes. The eccentric wheel 500 and the movable seat 400 can rotate synchronously with the driving shaft 911.

Figure 10:
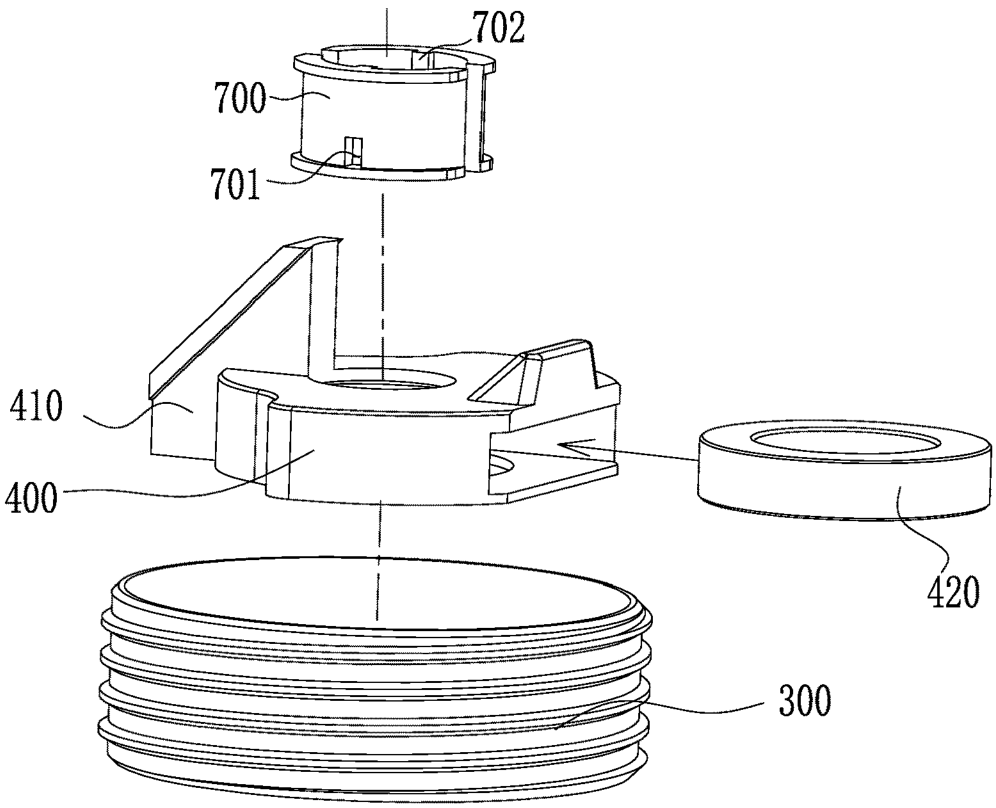
Figure 11:
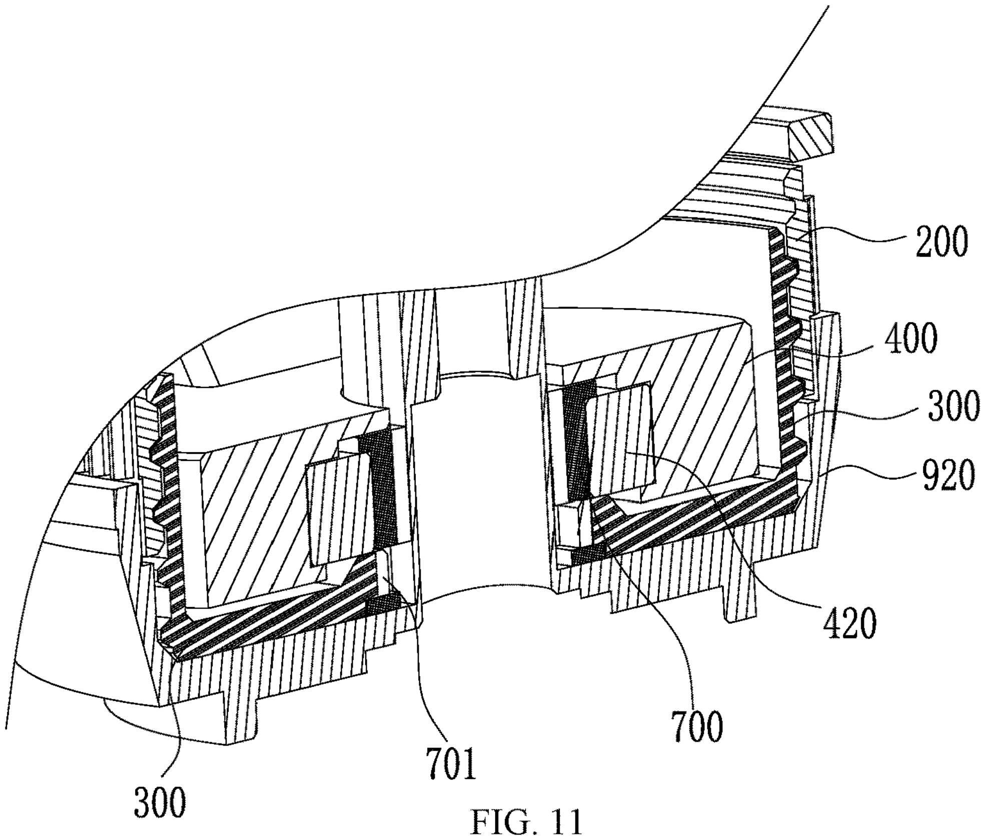
FIG. 11 is a cross-sectional view of some structures of the massage device of the present invention.

Please refer to FIG. 10 and FIG. 11, a collar 700 with a shaft hole, is sleeved between the driving shaft 911 and the movable seat 400. The movable seat 400 can rotate relative to the collar 700. For example, one or more holes 701 may be defined through the side wall of the collar 700, and protrusions may be formed on an edge of the inner hole of the annular bottom wall of the thread part 300 and clamped in the holes 701 so that the collar 700 can be fixed with the thread part 300. The annular external thread part 300 and the collar 700 cannot rotate, but can move together up and down along the shaft 911.

The movable seat 400 is also provided with a bearing 420 that is sleeved between the driving shaft 911 and the movable seat 400. Specifically, the movable seat 400 forms a cavity communicated with its shaft hole for receiving the bearing 420 therein, the driving shaft 911 passes through the collar 700, the bearing 420 is coaxially set outside the collar 700, and the movable seat 400 is coaxially set outside the bearing 420. An annular groove is formed along a circumference of the collar 700. An inner side of the bearing 420 is rotatably fitted in the annular groove of the collar 700, and is fixed in the inner wall of the cavity in the movable seat 400; thereby, the movable seat 400 and the bearing 420 can rotate together around the collar 700 by the bearing 420. The rotatable end 810 and the pulling end 820 are also provided with bearings 801 in the holes thereof. The collar 700 forms a protruding flange around an edge of the inner hole of the annular bottom wall, the protruding flange is fitted in the annular groove of the collar 700 below the bear 420 so that the collar 700 assembles the movable seat 400, the bear 420 and the annular external thread part 300 together, where the part 300 can take them moving axially, and the movable seat 400 and the bear 420 can rotate.

Please refer to FIGS. 1, 4, 6, and 8. The massage device also includes a bracket 920 that is sleeved on the driving shaft 911 and fixed with the diver 910. A limiting plate 923 with a center through hole, is disposed on the bracket 920. The bracket 920 has an annular chamber therein and a shaft bushing 921 extending from a center of a bottom wall of the bracket 920, and the annular chamber is formed around the shaft bushing 921. The driving shaft 911 passes through the bushing 921, and a top of the shaft 911 extends outside the bushing 921 into the shaft hole of the eccentric wheel 500 to drive the eccentric wheel 500 rotating together with the driving shaft 911. The eccentric wheel 500 and the driving shaft 911 are fixed together by radially inserting a pin or screw 501 into holes in the driving shaft 911 and the eccentric wheel 500, so that the eccentric wheel 500 and the driving shaft 911 rotate synchronously.

The annular internal thread part 200 is fixed in the annular chamber of the bracket 920. The rotatable knob 100 is disposed at one side of the bracket 920 and is disposed beside the annular internal thread part 200 with gear teeth meshed. The annular external thread part 300 is sleeved in the annular internal thread part 200. The movable seat 400 with the bear 420 and the collar 700 sleeved therein is arranged in the annular external thread part 300 and supported on the annular bottom wall of the annular external thread part 300. The movable seat 400 and the bear 420 can rotate in the annular external thread part 300, and can move up and down together with the collar 700 and the thread part 300. The hole size of the center through hole in the limiting plate 923 is adapted for the annular external thread part 300 and is smaller than the annular internal thread part 200, so that the annular external thread part 300 can move up and down through the center through hole of the plate 923, while the annular internal thread part 200 and the rotatable knob 100 are restricted below the limiting plate 923 and cannot move up or down. The bracket 920 and the limiting plate 923 can be fixed by screws. The shaft bushing 921 is set outside the driving shaft 911, passes through the center through holes of the sleeved thread parts 200 and 300, passes through the shaft holes of the sleeved slider 400, bear 420 and collar 700; and then pass through the center through hole of the limiting plate 923.

One or more grooves 922 are defined on an outer periphery of the shaft bushing 921 and extend along a height of the bushing 921, and one or more protrusions 702 are provided on inner wall of the collar 700 along a height of the collar 700 to cooperate with the grooves 922. Thereby, the annular external thread part 300 can take the movable seat 400 with the bear 420 and the collar 700 therein to move axially along the shaft bushing 921, specifically by the protrusions 702 of collar 700 sliding in the grooves 922 of bushing 921.

Figure 12:
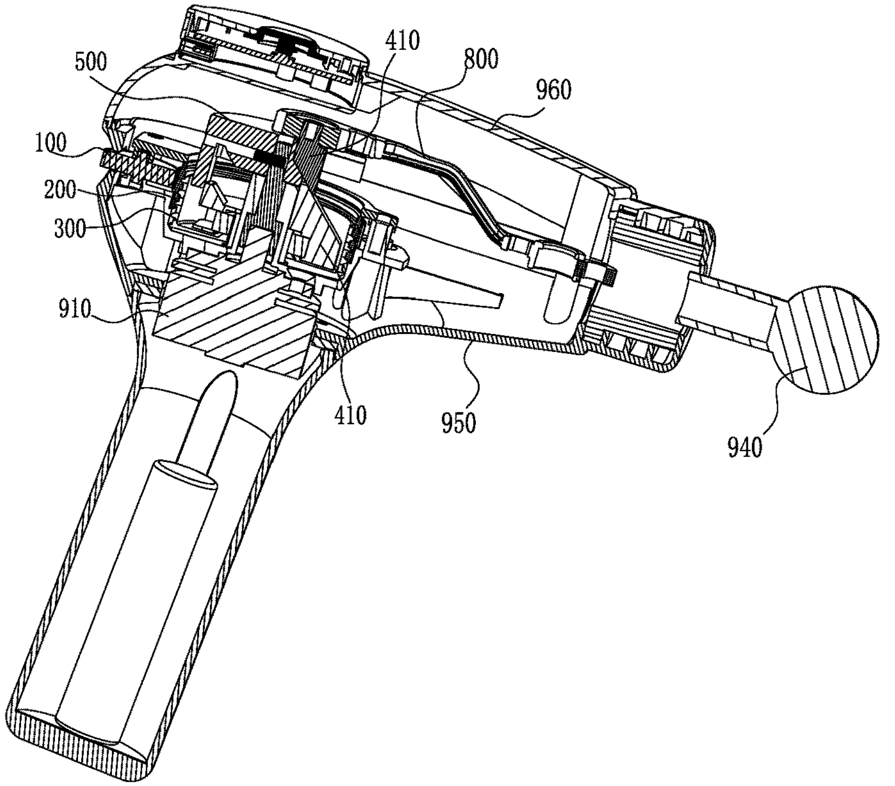
FIG. 12 is a cross-sectional view of the overall structure of the massage device in a first state in accordance with the embodiment of the present invention.
Figure 13:
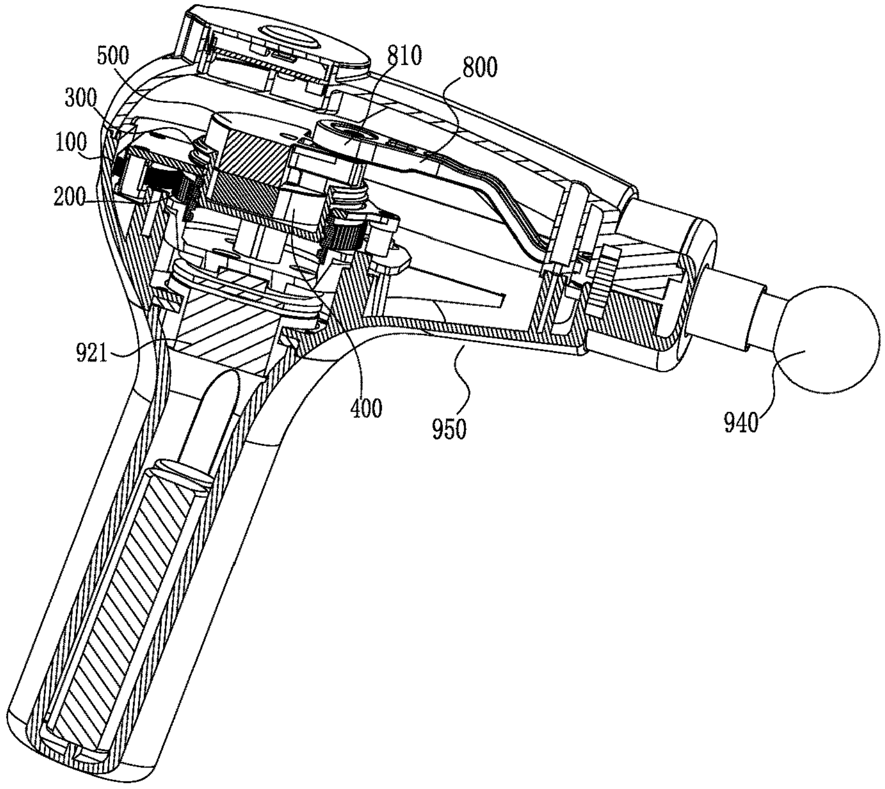
FIG. 13 is a cross-sectional view of the overall structure of the massage device in the second state in accordance with the embodiment of the present invention.

Please refer to FIG. 12 and FIG. 13, the massage device also includes a piston 930 and a shock absorbing sleeve 931. The pulling end 820 of the connecting rod 800 is connected to one end of the piston 930. The massaging head 940 is connected to the piston 930 and move linearly together with the piston 930. The piston 930 is disposed in a head housing and can be move in and out of the head housing, and a piston shock absorbing sleeve 931 is provided between the piston 930 and the head housing. A maximum distance between the rotatable end 810 of the connecting rod 800 and the driving shaft 911 corresponds to a maximum massage depth or a maximum massage amplitude of the massaging head 940.

The massage device also includes a PCBA board 961, a button 962, a panel 963, a handle 970, and a battery 980. The housing includes an upper housing 960 and a lower housing 950. The PCBA board 961, buttons 962, and panel 963 are mounted to the upper housing 960. The handle 970 is connected to the lower housing 950. The battery 980 is installed in the handle 970. A shock absorbing pad 971 is provided at the connection between the handle 970 and the lower housing 950.

In the present invention, a distance between the rotatable end 810 of the connecting rod 800 and the driving shaft 911 can be changed either the massage device in a massaging state (working state) or in a non-working state, that's, an eccentric radium of the eccentric wheel 500 can be changed in a working state (the driving shaft 911 drives the eccentric wheel 500 rotating) or in a stop state, so that the movement depth (massage amplitude) of the massaging head 940 can be adjusted for different massage needs of users, which is very flexible and convenient.

The technical features of the above embodiments can be combined arbitrarily. In order to make the description simple, all possible combinations of the technical features in the above embodiments are not described. However, as long as there is no contradiction in the combination of these technical features It is considered to be the range described in this specification.

The above examples only represent several embodiments of the present invention, and the descriptions thereof are specific and detailed, but should not be construed as a limitation on the scope of the invention patent. It should be pointed out that for those of ordinary skill in the art, without departing from the concept of the present invention, several modifications and improvements can also be made, which all belong to the protection scope of the present invention.

Therefore, the protection scope of the patent of the present invention should be subject to the appended claims.

What is claimed is:

1. A massage device, comprising:

a massaging head;

an eccentric wheel with a shaft hole;

a driver with a driving shaft that passes in the shaft hole of the eccentric wheel to drive the eccentric wheel rotating;

a slider slidably installed in the eccentric wheel so as to rotate together with the eccentric wheel;

a connecting rod with a rotatable end connected to the slider and an opposite pulling end connected to the massage head whereby the driving shaft drives the slider rotating to take the massaging head moving back and forth by the connecting rod for beating a user' muscle; and a movable seat with a shaft hole for the driving shaft passing through the shaft hole;

wherein the slider is installed at a side of the shaft hole of the eccentric wheel, and is radially slidable relative the shaft hole to move close to or away from the driving shaft so as to change an eccentric radium of the eccentric wheel; a bottom end of the slider defines an inclined groove that is inclined up and down in an direction parallel to the driving shaft; the movable seat is movable up and down along the driving shaft to move close to or away from the eccentric wheel, and the movable seat has an inclined protrusion fitted in and slidable along the inclined groove of the slider, whereby an axial movement of the movable seat will cause an radial sliding of the slider due to an engagement between the inclined protrusion and the inclined groove, which obtains a change of the eccentric radium, and accordingly, a movement depth of the massaging head is adjustable by driving the movable seat moving axially.

2. The massage device as claimed in claim 1, further comprising two thread parts either provided with external threads or internal threads and engaged with each other; wherein, due to a threaded engagement therebetween, one thread part is rotatable and the other thread part is linearly movable; the linearly movable thread part is axially movable, and is connected to the movable seat to take the movable seat axially moving; whereby the eccentric radium is adjustable by rotating the rotatable thread part to cause the linearly movable thread part and the movable seat axially moving so as to drive the slider radially sliding, and then a movement depth of the massaging head is accordingly adjusted.

3. The massage device as claimed in claim 2, wherein the rotatable thread part is an annular internal thread part; and the linearly movable thread part is an annular external thread part which is sleeved in and threadedly engaged with the annular internal thread part.

4. The massage device as claimed in claim 3, wherein the annular internal thread part is driven to rotate manually by a user or electrically by a driving motor.

5. The massage device as claimed in claim 3, wherein the annular internal thread part is provided with external gear teeth; a rotatable knob with external gear teeth is provided to mesh the annular internal thread part and drive the annular internal thread part rotating.

6. The massage device as claimed in claim 5, wherein the rotatable knob is driven to rotate manually by a user or electrically by a driving motor.

7. The massage device as claimed in claim 3, wherein the annular external thread part defines a chamber in center thereof and has an annular bottom wall; the movable seat is disposed in the chamber; the eccentric wheel is disposed above the movable seat; the driving shaft passes through the annular bottom wall and the chamber of the annular external thread part, and passes through the shaft hole of the movable seat; and then a top of the driving shaft is fitted in the shaft hole of the eccentric wheel to drive the eccentric wheel rotating; where the movable seat is rotatable together with the eccentric wheel due to a connection of the slider therebetween, and is axially movable together with the annular external thread part.

8. The massage device as claimed in claim 7, wherein the slider forms a short top shaft that is rotatably connected in a hole in the rotatable end of the connecting rod and drags the connecting rod to move back and forth when the slider rotates together with the eccentric wheel.

9. The massage device as claimed in claim 7, wherein a positioning frame is provided at one side of the shaft hole of the eccentric wheel, the slider is slidably disposed in the positioning frame and rotates together with the eccentric wheel; and the positioning frame has guide rail radially extending relative to the shaft hole, the slider is slidably supported and guided by the rail.

10. The massage device as claimed in claim 9, wherein there are two guiding rails either defining a guiding groove radially extending along the rail; the slider has two protruding flanges either slidably received in guiding groove; the slider slides radially along the rail to change a radial distance between the slider and the driving shaft.

11. The massage device as claimed in claim 7, wherein a collar with a shaft hole is coaxially sleeved in the shaft hole of the movable seat, the draft shaft passes through shaft hole of the collar; the collar is fixed with the annular external thread part, and axially installs the movable seat and the annular external thread part together; whereby the annular external thread part takes the movable seat and the collar axially move together with the annular external thread part, while the movable seat is rotatable.

12. The massage device as claimed in claim 11, wherein a bear is coaxially sleeved between the collar and the movable seat for the movable seat rotating relative to the collar; the movable seat defines a cavity for receiving the bearing; an outer side of the bear is tightly fitted to an inner wall of the cavity, and the inner side of the bear is rotatably sleeved on the collar.

13. The massage device as claimed in claim 12, wherein an annular groove is formed along a circumference of the collar; a protruding inner flange is formed along a center hole of annular bottom wall of the annular external thread part; the inner side of the bear and the protruding inner flange are fitted in the annular groove of the collar, where the bear is rotatable, and the annular external thread part is fixed with the collar by clamping.

14. The massage device as claimed in claim 11, wherein a bracket is fixed with the diver, the bracket has an annular chamber therein and a shaft bushing extending from a center of a bottom wall of the bracket, the annular chamber is around the shaft bushing; the driving shaft passes through the bushing and the top of the driving shaft extends outside the bushing into the shaft hole of the eccentric wheel; and the driver is a motor.

15. The massage device as claimed in claim 14, wherein the eccentric wheel and the driving shaft are fixed together by radially inserting a pin or screw into holes in the driving shaft and the eccentric wheel.

16. The massage device as claimed in claim 14, wherein the annular internal thread part and the annular external thread part are installed in the annular chamber of the bracket; the movable seat is arranged in the annular external thread part; and the shaft bushing is set outside the driving shaft, passes through center through holes of the sleeved thread parts, passes through the shaft holes of the sleeved slider, the bear and the collar.

17. The massage device as claimed in claim 16, wherein a limiting plate with a center through hole covers on the bracket; a hole size of the center through hole in the limiting plate is adapted for the annular external thread part and is smaller than the annular internal thread part, whereby the annular external thread part moves up and down through the center through hole of the limiting plate, while the annular internal thread part is restricted below the limiting plate; the driving shaft pass through the center through hole of the limiting plate 923.

18. The massage device as claimed in claim 14, wherein one or more grooves are defined on an outer periphery of the shaft bushing and extend along a height thereof, one or more protrusions are provided on an inner wall of the collar along a height thereof to cooperate with the grooves respectively; thereby, the annular external thread part can take the movable seat with the collar therein to move axially along the shaft bushing by the protrusions sliding in the axial grooves.

19. The massage device as claimed in claim 1, further comprises a PCBA board, a button, a panel, a handle, and a battery; wherein the housing includes an upper housing and a lower housing; the PCBA board, buttons, and panel are mounted to the upper housing; the handle is connected to the lower housing; and the battery is installed in the handle.

* * * * *